Oct. 5, 1965 L. E. PALMER 3,210,458
INSULATED OUTLET BOX WITH GROUNDING STRAP
Filed Jan. 30, 1963 2 Sheets-Sheet 1
FIG. 1
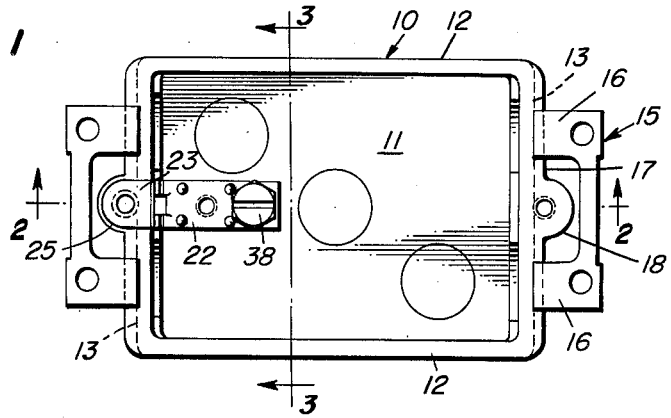
FIG. 2
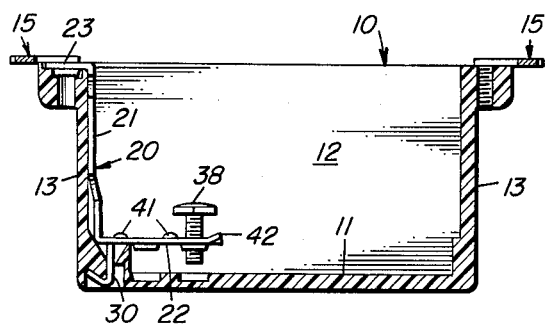
FIG. 3
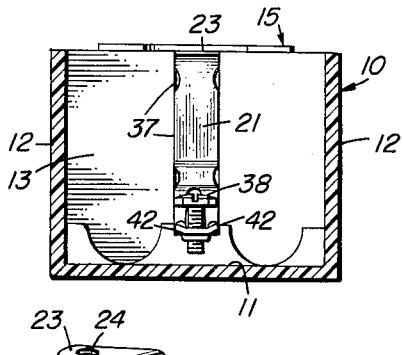
FIG. 5
FIG. 4
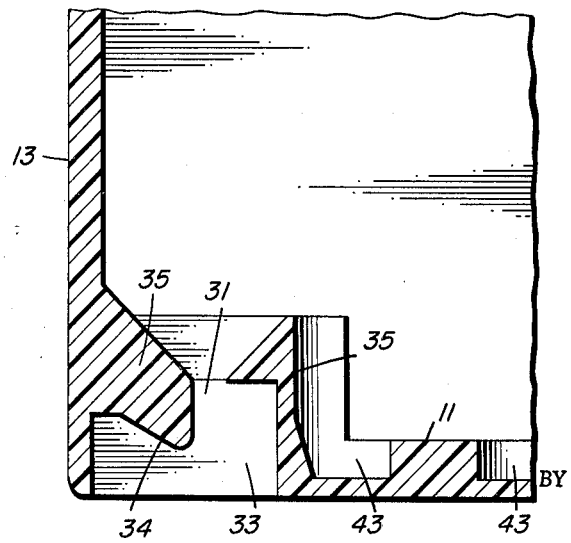
INVENTOR
Lewis E. Palmer
ATTORNEY Oct. 5, 1965  L. E. PALMER  3,210,458
INSULATED OUTLET BOX WITH GROUNDING STRAP
Filed Jan. 30, 1963  2 Sheets-Sheet 2
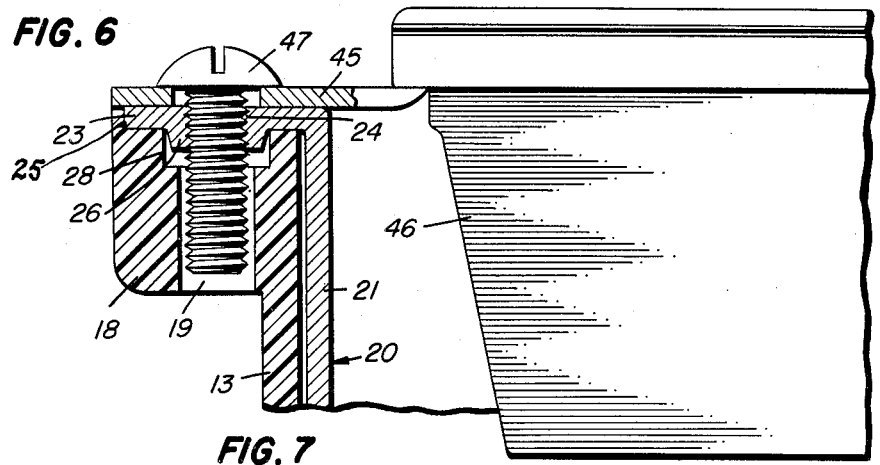
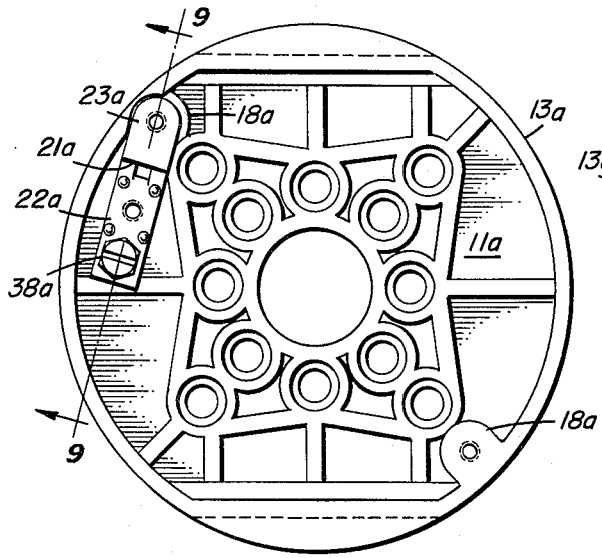
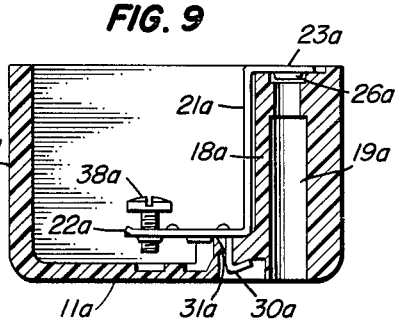
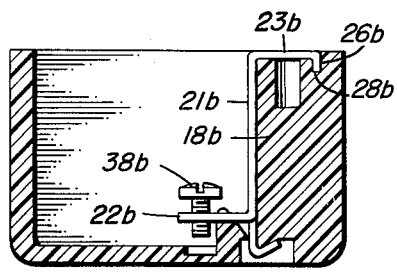
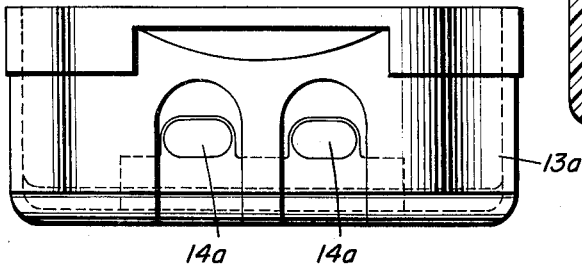
INVENTOR
Lewis E. Palmer
BY
ATTORNEY

United States Patent Office 3,210,458
Patented Oct. 5, 1965

3,210,458
INSULATED OUTLET BOX WITH GROUNDING STRAP
Lewis E. Palmer, Washington, W. Va., assignor to Union Insulating Company, Parkersburg, W. Va., a corporation of West Virginia
Filed Jan. 30, 1963, Ser. No. 255,019
7 Claims. (Cl. 174—51)

This invention relates generally to non-metallic electrical outlet and junction boxes usually molded by phenolic resin or similar insulating plastic materials; and it relates more particularly to a grounding strap and the mounting of it on such a box.

In the past grounding straps or members carrying screws for the attachment of the grounding wires of the electric cables, have been mounted in such boxes of non-conducting materials, the grounding members having some portion in electrical connection with the mounting strap of a switch or outlet receptacle or some other electrical device, that is mounted across the open face of the box, but such grounding members have been fastened in the box by screws or other additional means.

One object of the invention is to provide a simple, inexpensive and effective means for fastening a grounding strap to an insulated box without the use of a screw or any additional part.

Another object is to provide a grounding strap of such construction that it may be quickly assembled on the molded box and then securely fixed thereto by a power press operation, thereby reducing the cost of producing such boxes.

With the above and other objects and advantages in view, the invention resides in the novel combinations and arangements of parts and the novel features of construction hereinafter described and claimed, and illustrated in the accompanying drawings which show the present preferred embodiments of the invention.

In the drawings:

FIG. 1 is a top or front face view of a commonly used rectangular box with the improved grounding strap mounted therein;

FIG. 2 is a longitudinal sectional view on the line 2—2 in FIG. 1;

FIG. 3 is a transverse sectional view on line 3—3 in FIG. 1;

FIG. 4 is a perspective view of the grounding strap showing its shape before it is applied to the box;

FIG. 5 is an enlarged detail sectional view showing the shape of the molded slot in the bottom of the box in which a fastening tongue on the grounding strap is clinched;

FIG. 6 is a detail sectional view on an enlarged scale showing the ear or end of the mounting strap of an outlet receptacle mounted on the top of the grounding strap, these parts being held in electrical contact by the fastening screw at one end of the mounting strap;

FIG. 7 is a top view of a circular type box with the improved grounding strap mounted therein;

FIG. 8 is a side view of the box shown in FIG. 7;

FIG. 9 is a sectional view taken on the line 9—9 in FIG. 7; and

FIG. 10 is a view similar to FIG. 9 showing a slight modification of the grounding strap.

The drawings show two well known types of outlet or junction boxes, each of which has a bottom, a surrounding upright side wall that may be variously shaped and an open front face across which the electrical device is mounted. In FIGS. 1–6 the box-like body 10 has a flat bottom wall 11, opposed side walls 12 and opposed end walls 13. The box is molded preferably of phenolic resin or similar hard plastic insulating material, in the most simple type of molding press in which the movable die part has a straight line movement and there are no laterally movable die parts. In two of the opposed walls, preferably the end walls 13, are molded the usual knockouts 14 for the insulated cables or conductors that enter the box. Molded in the end walls at the front or top of the box are the usual metallic box mounting plates 15. These apertured plates are of substantially U-shape in plan and their two arms 16 have portions molded in the wall or in transversely extending and end-wise projecting ribs 17 on the end walls 13 at the open face of the box. The two arms 16 straddle a centrally positioned upright rib or enlargement 18 molded on the end walls between the ribs or extensions 17, and in each of the enlargements 18 is a screw threaded hole 19 to receive one of the two usual screws which fasten the mounting strap of a switch, outlet receptacle or other electrical device on the box. The ends of the mounting strap are in the plane of the arms 16; and that plane is slightly above the plane of the upper or outer edges of the box walls 12 and 13. The screw holes or openings 19 may of course be formed in the end walls 13 if they are made thick enough, but usually those walls are relatively thin and have enlargements or thickened portions along their upper edges. All of the foregoing structure is old and in current use in boxes molded of plastic insulating material.

The invention resides in the structure and the mounting of a grounding strap in such a box without the use of a screw or any additional part as above noted. The improved grounding strap 20 is formed from one rectangular strip of sheet metal of suitable gage. It comprises a flat upright body portion 21 disposed adajacent to or against the inner face of one of the end walls 13, a flat right angularly projecting lower portion 22 at the lower end of the body portion and a right angularly projecting apertured ear 23 at the upper end of the body portion. The lower or bottom portion 22 preferably projects towards the center of the box and is slightly spaced above the bottom wall 11, while the ear 23 projects in the other direction or outwardly and is adapted for supporting engagement with the upper edge or rim of the end wall 13. The aperture 24 in the ear 23 is adapted to register with the screw hole 19 and if the aperture or hole 24 is screw threaded, the hole 19 need not be threaded. Preferably the ear 23 is set in a similarly shaped recess 25 formed in the edge or rim of the wall 13 so that the upper face of the ear is flush with the edge or rim of the box. In forming the hole 24 I preferably form a downwardly extending annular extrusion 26 around it and the extrusion is seated in an annular recess 28 in the top of the wall around the hole 19. When that is done the hole or aperture in the ear is preferably screw threaded.

The grounding strap 20 is fixed in the box by the ear and a bendable tongue 30 formed integrally with its lower portion and adapted to be bent laterally after it is inserted in a slot 31 formed in the bottom 11 of the box. This anchoring tongue 30 is preferably stamped out of the material of the strap at the juncture of its portions 21 and 22, as will be seen upon reference to FIGS. 2 and 4. Prior to applying the grounding strap to the box the tongue 30 is straight and projects downwardly from the bottom portion 22 as shown in FIG. 4. The slot 31 in the bottom wall 11 has an enlarged lower end 33 in which is formed a downwardly facing shoulder 34 against and under which the end of the tongue is bent. When the box walls are relatively thin as shown, the parts 31, 33, 34 are formed in a thickened portion or enlargement 35 formed on the interior of the box at the juncture of the bottom wall 11 with the associated end wall 13, as shown in FIG. 5.

In fastening the grounding strap to the body, the ear 23 is seated on the upper edge of the end wall as above set forth, and the straight tongue is inserted in the slot 31, and then by a power press operation, the end of the tongue is bent into engagement with the shoulder 34 as shown in FIG. 4. The bent tongue thus holds the grounding strap against any upward movement, and when the extrusion 26 is seated in the recess 28, there can be no inward or lateral movement of the upper portion of the strap.

If desired the inner face of the end wall 13 may be formed with an upright channel or groove 37 of a depth corresponding to the thickness of the metal from which the grounding strap is made, the groove receiving at least a part of the body portion 21 of the strap. That will prevent the portion 21 from extending into the box and thus restrict the overall length of an electrical device that may be used in the box. When the channel 37 is used, I may form on the outside of that end wall an external vertically extending rib or enlargement (not shown) opposite the channel in order to strengthen that end wall.

On the bottom portion 22 of the grounding strap may be mounted one or more screws to fasten grounding wires in cables that enter the box through the knockouts. As shown one binding screw 38 is threaded in a hole 39 and a second longitudinally spaced threaded hole 40 may receive a second screw if needed. Adjacent these holes are raised bosses or projections 41 and 42 to prevent conductor wires from slipping from under the heads of binding screws. If the bottom part 22 is very closely spaced from the bottom wall 11 of the box, the latter may be formed with recesses 43 to receive the lower ends of the binding screws.

It will be understood that apertured ends or ears of the mounting strap of an electrical device such as a switch or a duplex outlet receptacle are positioned on ends 13 of the box and when that is done one of the ends will rest on and be in electrical contact with the ear 23. The strap completes the connection from the wire through the mounting screw of the electrical device thus grounding it. In FIG. 6 one end 45 of a mounting strap of a duplex outlet receptacle 46 is so positioned, and one of the usual fastening screws 47 for the receptacle is shown as threaded into the extrusion 26 of the grounding strap to fasten that end of the mounting strap to the ear 23, but it is obvious that if the extrusion is not screw threaded the screw 47 may be engaged with threads in the hole 19.

By merely seating the upper end or ear 23 of the grounding strap on the top of the wall it will be held in electric contact with the receptacle mounting strap by the usual fastening screw for the receptacle and by anchoring the grounding strap by bending the tongue in the slot in the bottom of the box, the grounding strap will be mounted without the use of any screw or additional part, and in an extremely simple, inexpensive and effective manner.

In FIGS. 7-9 the grounding strap is shown as mounted in a box which is circular but which of course, may be of octagon or other shape. This box also has a bottom wall 11$^a$ and a surrounding circular side wall 13$^a$. At diametrically opposite points on the side wall are formed upright ribs or enlargements 18$^a$ which correspond to the ears 18 but are disposed within the box and extend from the top to the bottom of the box. These enlargements or posts 18$^a$ have openings 19$^a$ corresponding to the openings 19. The construction of the grounding strap is substantially the same as that previously described and its upright body portion 21$^a$ is disposed along the side of one of the enlargements. The apertured ear 23$^a$ of the strap is seated on one of the enlargements 18$^a$ and the adjacent edge of the wall 13$^a$, as seen in FIGS. 7 and 9, to receive one of the screws that fasten the electrical devices on the enlargements. That ear is shown as formed with the screw threaded extrusion 26$^a$. The bottom portion or arm 22$^a$ of the grounding strap, instead of projecting toward the center of the box, is disposed close to the inner side of the wall 13$^a$, and it carries one or more conductor binding screws 38$^a$. The struck out anchoring tongue 30$^a$ passes through a slot 31$^a$ in an enlargement on the bottom wall and is bent into locking engagement with a shoulder in the slot. The wall 13$^a$ has on opposite sides the usual knockouts 14$^a$ for the electrical cables which may be fastened by the usual metal clamps (not shown).

While the tongue 30 will hold the ear 23 in engagement with the upper edge of the wall 13, I preferably provide interengaged parts on the wall and ear to prevent lateral shifting of the latter. In FIG. 6 the extrusion 26 and its recess 28 provide such interengaged parts, but other anchoring means may be used such as shown in FIG. 10. In this modification the apertured ear 23$^b$ has its extremity bent downwardly to form an anchoring lug 26$^b$ that is seated in a similar shaped socket 28$^b$ formed in the top of the enlargement 18$^b$. In FIG. 10 the lower portion 22$^b$ of the grounding strap is short and carries only one binding screw 38$^b$.

From the foregoing taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. An insulated electrical outlet box for supporting an electrical device having at each end rigid oppositely-extending coplanar metal mounting elements, comprising an open-top box molded of insulating material and including horizontal bottom and vertical side walls, oppositely disposed upper edge portions of said side walls containing downwardly extending bores adapted to receive fastening screws by means of which the mounting elements of said electrical device are fastened against the edge surfaces of said side wall portions, respectively, said bottom wall containing a through slot arranged adjacent one of said side walls in the vertical plane passing through said bores, the lower surface of said bottom wall containing a recess communicating with the slot and defining a shoulder having a downwardly facing surface;

and an electrically conductive ground strap mounted in said box, said ground strap including a vertical portion contiguous with the inner surface of said one side wall adjacent the bore therein, a first horizontal portion extending outwardly from the upper end of said vertical portion across the upper edge of said one side wall and the bore contained therein, said first horizontal portion containing an aperture in registry with said bore for receiving said fastening screw, second horizontal portion extending from the lower end of said vertical portion over the bottom wall above the slot therein, said second horizontal portion carrying means within the box for the attachment thereto of the ground wire of an electrical cable, and a bendable tongue portion struck downwardly from said strap, said tongue portion extending downwardly through said slot and terminating in an end portion bent into locking engagement with said shoulder surface, whereby said tongue and said first horizontal portion fasten said ground strap against vertical movement in the box.

2. An insulated electrical outlet box for supporting an electrical device having at each end rigid metal oppositely-extending coplanar mounting elements, comprising an open-top box molded of insulating material and including horizontal bottom and vertical side walls, oppositely disposed upper edge portions of said side walls containing downwardly extending bores adapted to receive fastening screws by means of which the mounting elements of said device are rigidly fastened against the side wall edge surfaces, said bottom wall containing a through slot arranged adjacent one of said side walls in the vertical plane passing through said bores, the lower surface of said bottom wall containing a recess communicating with the slot and defining a shoulder having a downwardly-facing upwardly-inclined surface arranged at an acute angle with respect to the vertical axis of the slot;

and an electrically conductive ground strap mounted in said box, said ground strap including a vertical portion contiguous with the inner surface of said one side wall adjacent the bore therein, a first horizontal portion extending from the upper end of said vertical portion across the bore contained in said one side wall, said first horizontal portion containing an aperture in registry with said bore, means carried by said first horizontal portion and co-operating with a corresponding recess contained in said one side wall for preventing axial movement of said first horizontal portion relative to the box, a second horizontal portion extending from the lower end of said vertical portion over the bottom wall above the slot therein, said second horizontal portion carrying means within the box for the attachment thereto of the ground wire of an electrical cable, and a bendable tongue portion struck downwardly from said ground strap, said tongue portion extending downwardly through said slot and terminating in an end portion reversely bent upwardly into locking engagement with said shoulder surface, whereby said tongue, said first horizontal portion and said recess cooperative means fasten said ground strap in the box.

3. An insulated electrical box as defined in claim 2, wherein said means preventing axial movement of said first horizontal portion comprises a downwardly bent lug carried by the free end of said first horizontal portion.

4. An insulated electrical box as defined in claim 3 wherein said means preventing axial movement of said first horizontal portion comprises a downwardly extending annular extrusion surrounding the aperture contained in said first horizontal portion, said bore comprising the recess receiving said annular extension.

5. An insulated electrical box as defined in claim 4 wherein said annular extrusion is internally screw threaded to receive one of said fastening screws.

6. An insulated electrical box as defined in claim 2 wherein the inner surface of said one side wall contains a vertical channel receiving said vertical portion of said ground strap.

7. An insulated electrical box as defined in claim 2 wherein the upper edge of said one side wall contains a recess receiving said first horizontal portion of said ground strap, said recess having a depth equal to the thickness of said first horizontal strap portion whereby the upper face of said first portion is coplanar with the upper edge surface of said side wall.

References Cited by the Examiner

UNITED STATES PATENTS

| | | | |
|---|---|---|---|
| 2,450,873 | 10/48 | Anthony | 339—134 X |
| 2,674,722 | 4/54 | Hubbell et al. | 339—14 |
| 2,683,864 | 7/54 | Hubbell et al. | 339—14 |
| 2,802,972 | 8/57 | Warrington | 174—52 X |
| 2,872,503 | 2/59 | Winter | 174—51 |

FOREIGN PATENTS

| | | |
|---|---|---|
| 883,464 | 7/53 | Germany. |
| 828,790 | 2/60 | Great Britain. |

LARAMIE E. ASKIN, *Primary Examiner.*

DARRELL L. CLAY, E. JAMES SAX, *Examiners.*